April 26, 1938.   F. W. ANDERSON   2,115,356
HEAT TRAP
Filed Dec. 5, 1936
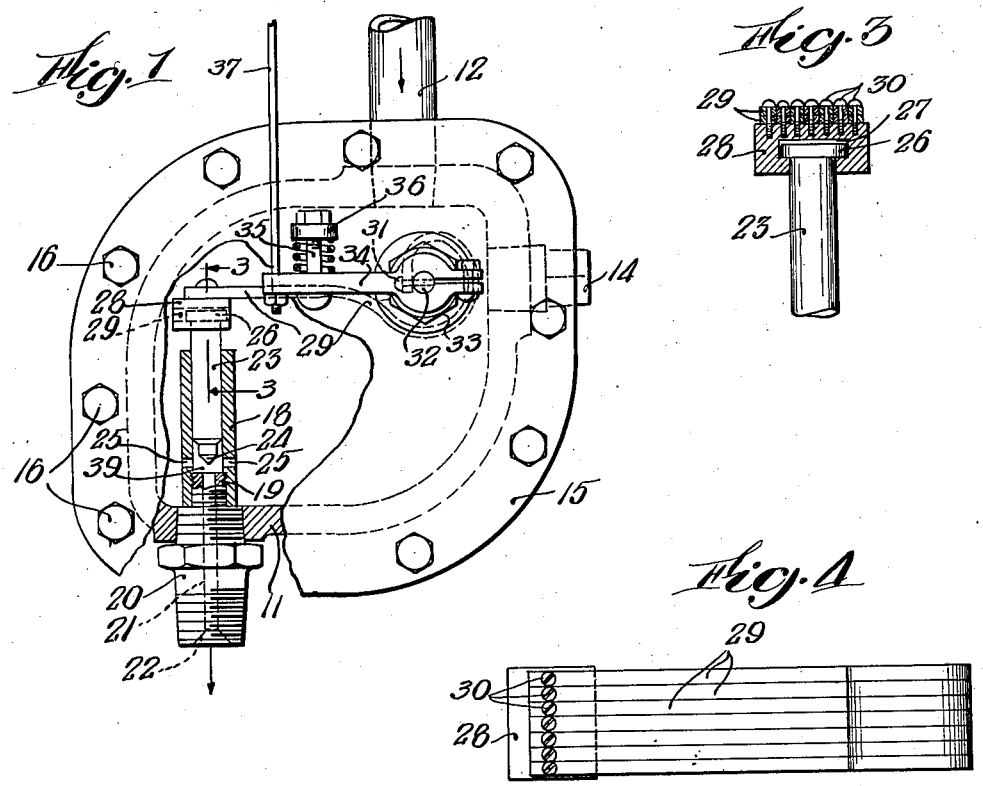
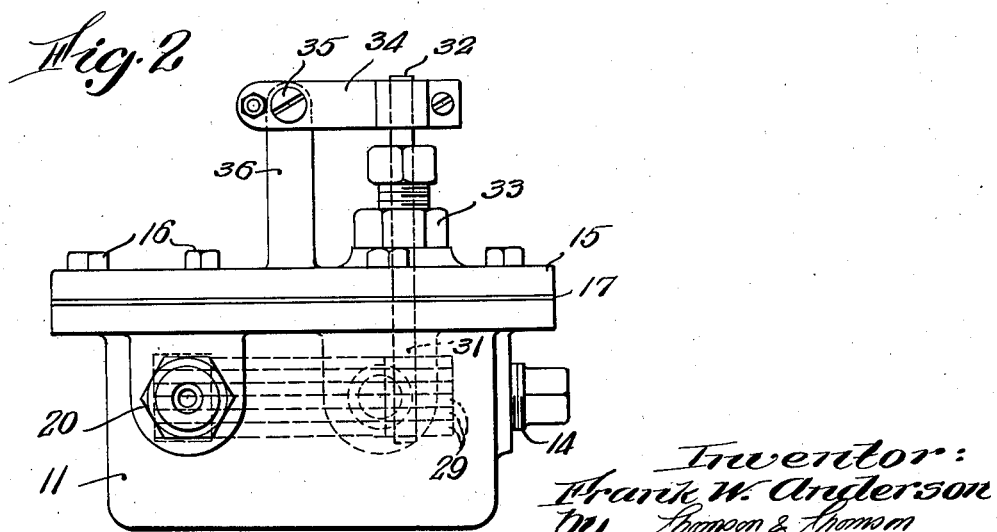
Inventor:
Frank W. Anderson
by Thomson & Thomson
his Attys.

Patented Apr. 26, 1938

2,115,356

UNITED STATES PATENT OFFICE 2,115,356

HEAT TRAP

Frank W. Anderson, Roslindale, Mass., assignor of one-half to Orr J. Palmer, Quincy, Mass.

Application December 5, 1936, Serial No. 114,425

5 Claims. (Cl. 236—59)

This invention relates to improvements in hot water or steam traps, and the principal purpose of the invention is to provide a durable, efficient and economical trap having a thermostatically operated valve arranged to open or close abruptly, thereby to avoid the wearing or pitting of the valve seat which characterizes the slow-acting valves heretofore used in traps of this type.

Further objects reside in the novel construction and mode of operation of the thermostatic element and valve of the improved trap as hereinafter described and pointed out in the appended claims.

A recommended form of a hot water trap embodying this invention and adapted particularly for the heat system of a laundry, is illustrated in the accompanying drawing, in which:

Fig. 1 is a side view looking toward the cover of the improved trap, partly broken away and partly in section;

Fig. 2 is a bottom view of the trap as shown in Fig. 1;

Fig. 3 is a detail section on line 3—3 of Fig. 1; and

Fig. 4 is a plan view of the thermostatic element of the trap shown in Figs. 1 and 2.

In the particular embodiment chosen for the purpose of illustration, the trap comprises a casing having body casting 11 providing a chamber for hot water or steam, and having inlet and outlet ports 12 and 20, respectively, and a plugged, optional inlet 14 in one side; a cover 15 secured upon the flanged open side of the body or casing by bolts or cap screws 16, and sealed by a gasket 17; a valve mounted at the outlet; and a thermostatic control for the valve, carried by the side or cover 15. The trap is preferably mounted for use in the position shown in Fig. 1, but it will be evident that it may be suitably mounted at any convenient angle.

The valve consists of a metal tube or sleeve 18 screwed upon a threaded end 19 of a nipple 20 mounted in the outlet and having a relatively small opening 21 therethrough which may terminate in a flaring mouth 22 at the outer end of the nipple; and a rod or stem 23 slidable in the tube and formed with a pointed or conical tip 24 adapted to engage the valve seat at the inner end of the opening 21. Radial ports 25 in the tube 18 lead to a chamber 39 between the valve tip and the valve seat when the valve is open as shown in Fig. 1, so that water may flow through the ports 25 and outlet orifice 21.

The opposite end of the valve stem 23 is provided with a peripheral flange or nut 26 which is slidably received in the slot 27 of a block 28 to which the bimetallic strips 29 of the thermostatic control are attached by welding or by screws 30 as best shown in Figs. 3 and 4. The opposite ends of the parallel thermostatic strips 29 are coiled about and attached by welding or by screws 31 to a spindle 32 which passes inwardly through a stuffing box 33 on the cover 15. It will be understood that the number and width of the resilient bimetallic strips 29 may be varied as desired.

A lever or arm 34 is fastened to the outwardly projecting end of the spindle 32 and an adjustment screw 35, under spring tension, connects the arm 34 with a stationary support 36 affixed to the cover, so that the position of the spindle and, consequently, the position of the coiled thermostat and the valve may be manually varied by operating the adjusting screw when desired. The adjustment is preferably such that the trap valve will automatically open at approximately 160° F. and automatically close at 180° F., under a water pressure of 100 pounds or higher. In case of necessity, however, the valve may be manually opened or closed without removing the cover 15, by moving the lever 34 or rod 37 connected to its outer end. Such manual operation of the valve is particularly important when it is desired to produce a "blow through" of the hot water after the trap and heat system have been inactive, in order to afford quick heat in the system.

It will be understood that any rotative movement of the spindle 32 changes the position of the thermostatic link with the valve stem 23 and tends to move the valve tip toward or from its seat; and that variations in temperature of the water within the trap automatically change the position of the expansible thermostatic strips and thus tend to open or close the valve. For example, if the coiled thermostat as shown in Fig. 1 is caused to expand by higher temperature conditions, the valve stem will move toward closing position.

As the valve starts to close under influence of the thermostat, the pressure in the inner end of the outlet orifice 21 immediately drops, and the valve stem is snapped against its seat by the differential in water pressure inside and outside the valve which overcomes any resistance of the resilient thermostat. Conversely, when a drop in the water temperature causes the thermostat to contract and thus tends to move the valve off its seat, the initial movement of the valve stem allows hot water to enter chamber 39 through the tube ports 25, thus raising the pressure in the inner end of the orifice 21 and equalizing the pressure on the opposite ends of the valve stem, and allowing the stem to be quickly moved to fully open position under the action of the resilient thermostat. In the latter case, the initial contraction of the thermostatic element tends to build up a torque in the resilient strips 29, owing to the resistance of the water pressure; and that torque action is released when pressure is equalized, as aforesaid, so that the valve springs to fully open position.

The rapid action of the valve results from the provision of the relatively long and narrow outlet orifice 21 which, in combination with the apertured sleeve 18, ensures that a differential in pressure is created between the inner and outer ends of said orifice, when the valve tip 24 is slightly off seat in opening or closing movement. It will be observed that the bore of the orifice 21 is substantially smaller than that of the sleeve or tube 18, and that the length of the orifice is very much greater than the diameter of its bore, the proportion being approximately ten to one in the size illustrated. Such an arrangement creates a rapid drop in pressure at the inner end of the orifice when the valve is closing, and a rapid build up of pressure at that point when the valve is opening.

A quick-acting valve constructed as above described is especially desirable and efficient in a high pressure hot water system for which the trap herein illustrated was devised, for it eliminates the wear and corrosion of the valve seat resulting from the rush of water past the partially open elements of a slow acting valve. This advantage is also achieved when a trap of the character indicated is employed in a steam system, for a quick-acting valve avoids prolonged wearing action of the steam on the valve seat; and this invention is intended for use with steam as well as hot water, as aforesaid.

The improved trap not only provides a positive, durable and quick-acting valve, but also affords economies in manufacture owing to the simplicity of the parts and the ease of assembly. It will be noted, for example, that all of the movable elements are carried by the trap cover 15 and (except for the valve stem 23) may be mounted as a unit on the cover before it is screwed to the body 11.

It will be apparent that the structural details of the trap herein illustrated and described may be varied to suit particular purposes without departing from the essence of this invention as defined in the following claims.

I claim:

1. A heat trap of the character described comprising a casing provided with inlet and outlet ports, the outlet having a relatively long and narrow discharge orifice, the inner end of which constitutes a valve seat, a sleeve disposed within the casing and extending inwardly from the valve seat and having radial ports adjacent said seat, a valve stem slidable in said sleeve and having a tip engageable with the valve seat to close the discharge orifice, and a thermostatic element connected to the valve stem and automatically operative under changing conditions of temperature within the casing to cause rapid opening or closing of the valve, the bore of the orifice being substantially less than that of the sleeve and the length of the orifice being very much greater than the diameter of its bore, so that the valve rapidly snaps to open or closed position under influence of said thermostatic element.

2. A heat trap of the character described comprising a casing provided with inlet and outlet ports, the outlet having a relatively narrow discharge orifice, the inner end of which constitutes a valve seat, a sleeve disposed within the casing and extending inwardly from the valve seat, and having radial ports adjacent said seat, a valve stem slidable in said sleeve and having a tip engageable with the valve seat to close the discharge orifice, a spindle extending into the casing through the cover, and a resilient thermostatic member coiled about and attached to said spindle and connected at its opposite end to the valve stem for automatically opening or closing the valve under changing temperature conditions, and manually operable adjusting means located on the outside of the cover for rotating the spindle to vary the position of the coiled thermostatic element.

3. A heat trap of the character described comprising a casing provided with inlet and outlet ports, the outlet having a relatively narrow discharge orifice, the inner end of which constitutes a valve seat, a sleeve disposed within the casing and extending inwardly from the valve seat, and having radial ports adjacent said seat, a valve stem slidable in said sleeve and having a tip engageable with the valve seat to close the discharge orifice, a spindle extending into the casing through the cover, and a resilient thermostatic member coiled about and attached to said spindle and connected at its opposite end to the valve stem for automatically opening or closing the valve under changing temperature conditions, and manually operable means connected to the spindle on the outer side of the cover for rotating the spindle to move the thermostatic member and open the valve irrespective of the temperature within the casing.

4. A heat trap of the character described comprising a casing provided with inlet and outlet ports, the outlet having a relatively narrow discharge orifice, the inner end of which constitutes a valve seat, a sleeve disposed within the casing and extending inwardly from the valve seat, and having radial ports adjacent said seat, a valve stem slidable in said sleeve and having a tip engageable with the valve seat to close the discharge orifice, a spindle extending into the casing through the cover, and a resilient thermostatic member coiled about and attached to said spindle and connected at its opposite end to the valve stem for automatically opening or closing the valve under changing temperature conditions, an arm connected to the outer end of the spindle and adapted to rotate the spindle to vary the position of the thermostatic member, an adjusting screw for setting the arm in predetermined position, the arm being manually movable to rotate the spindle and open the valve, irrespective of the setting of the adjusting screw or the temperature within the casing.

5. A heat trap of the character described, comprising a casing provided with inlet and outlet ports, the latter having a discharge orifice and a valve seat at its inner end, a valve having a tip engageable with said seat to close the outlet, a spindle extending into the casing through the cover, and a resilient thermostatic member coiled about and attached to said spindle and connected at its opposite end to the valve stem for automatically opening or closing the valve under changing temperature conditions, and manually operable adjusting means located on the outside of the cover for rotating the spindle to vary the position of the coiled thermostatic element.

FRANK W. ANDERSON.